US012625329B2

(12) United States Patent
Sonoda

(10) Patent No.: US 12,625,329 B2
(45) Date of Patent: May 12, 2026

(54) OPTICAL DEVICE, OPTICAL MODULE, AND OPTICAL TRANSMISSION AND RECEPTION APPARATUS

(71) Applicant: FUJITSU OPTICAL COMPONENTS LIMITED, Kawasaki (JP)

(72) Inventor: Hirohiko Sonoda, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 365 days.

(21) Appl. No.: 18/514,487

(22) Filed: Nov. 20, 2023

(65) Prior Publication Data

US 2024/0264390 A1    Aug. 8, 2024

(30) Foreign Application Priority Data

Feb. 6, 2023    (JP) ................................. 2023-016394

(51) Int. Cl.
*G02B 6/42*        (2006.01)
(52) U.S. Cl.
CPC ......... *G02B 6/4215* (2013.01); *G02B 6/4246* (2013.01)
(58) Field of Classification Search
CPC ............................ G02B 6/4246; G02B 6/4215
See application file for complete search history.

(56) References Cited

U.S. PATENT DOCUMENTS

| | | | | |
|---|---|---|---|---|
| 6,717,970 B2 * | 4/2004 | Marsh | ....................... | H01S 5/10 |
| | | | | 372/50.1 |
| 9,557,624 B2 * | 1/2017 | Sugiyama | ............ | H04B 10/501 |
| 2001/0053262 A1 * | 12/2001 | Kinoshita | .......... | G02B 6/29361 |
| | | | | 385/24 |
| 2002/0031304 A1 | 3/2002 | Roberts et al. | | |

FOREIGN PATENT DOCUMENTS

| | | |
|---|---|---|
| JP | 11-258437 | 9/1999 |
| JP | 2016-018894 | 2/2016 |
| WO | WO 2008/108422 A1 | 9/2008 |

* cited by examiner

*Primary Examiner* — Michael P Mooney
(74) *Attorney, Agent, or Firm* — STAAS & HALSEY LLP

(57) ABSTRACT
An optical device has a waveguide circuit, a transmitter that transmits transmitted light to the waveguide circuit, and a receiver that receives received light from the waveguide circuit. The waveguide circuit has an optical waveguide, a wavelength combiner and splitter, and a mode filter. The optical waveguide includes a first port where the transmitted light output from the transmitter is input to and a second port where the transmitted light is output from, guides the transmitted light, and guides the received light input from the second port. The wavelength combiner and splitter is arranged in the optical waveguide between the first port and the second port. The mode filter removes a higher-order mode of the received light input by use of the wavelength combiner and splitter and includes a third port that outputs the received light having the higher-order mode removed from the received light, to the receiver.

8 Claims, 10 Drawing Sheets

RELATED ART

OPTICAL DEVICE, OPTICAL MODULE, AND OPTICAL TRANSMISSION AND RECEPTION APPARATUS

CROSS-REFERENCE TO RELATED APPLICATION

This application is based upon and claims the benefit of priority of the prior Japanese Patent Application No. 2023-016394, filed on Feb. 6, 2023, the entire contents of which are incorporated herein by reference.

FIELD

The embodiments discussed herein are related to optical devices, optical modules, and optical transmission and reception apparatuses.

BACKGROUND

Traffic volumes in large scale data centers are dramatically increasing with the advancement of the Internet, for example. For example, building a data-driven society is hoped for, the data-driven society utilizing artificial intelligence (AI), advancement of machine learning, the Internet of Things (IoT) connected to an enormous number of various sensors and terminals, and autonomous driving technologies. With the advancement of introduction of 5G mobile communication systems, the traffic volumes are increasing acceleratingly.

For 5G, for example, about 100 antenna base stations are needed in a cell having a radius of two kilometers. For 6G, higher radio frequencies and smaller cell radii are expected, and for example, about 10,000 antenna base stations are thus needed in a 6G cell having a radius of two kilometers. For 6G, communication of one terabit per second (Tbps) or faster, which is even faster than 100 gigabits per second (Gbps), is expected. Conventional 3G and 4G base stations are installed in or near buildings of communication service providers and these base stations are connected to networks. For 5G and 6G base stations, more of so-called optical fronthaul is also being introduced. This so-called optical fronthaul has optical fibers extending from a 3G or 4G base station or an office of a communication service provider, the office having a base station installed therein.

Therefore, there is a demand for development of an optical transceiver having a single-fiber bidirectional optical device installed therein, in years to come, for example, by 2030, the single-fiber bidirectional optical device using a single mode fiber for a distance less than ten kilometers and being 100 Gpbs-class.

FIG. 9 is a diagram illustrating an example of an optical device 100. The optical device 100 illustrated in FIG. 9 is a single-fiber bidirectional optical device. The optical device 100 has an optical transmission terminal portion 110, an optical receiving terminal portion 120, a device body 130, and an optical fiber connecting portion 140. The optical transmission terminal portion 110 has a light emitting element 111 and a condenser lens 112. The light emitting element 111 is a laser diode (LD) that emits transmitted light. The condenser lens 112 is a lens that condenses the transmitted light from the light emitting element 111. The optical receiving terminal portion 120 has a condenser lens 121, a preamplifier 122, and a light receiving element 123. The condenser lens 121 is a lens that condenses received light. The preamplifier 122 is an optical amplifier that optically amplifies the received light condensed by the condenser lens 121. The light receiving element 123 is a photodiode (PD) that implements electric conversion of the received light that has been optically amplified by the preamplifier 122.

The device body 130 has an optical waveguide 131 and a wavelength filter 132. The optical waveguide 131 is a waveguide where the transmitted light and the received light are guided through. The optical waveguide 131 has an optical input port 131A optically coupled to the optical transmission terminal portion 110, an optical output port 131B optically coupled to the optical receiving terminal portion 120, and a transmission line port 131C optically coupled to the optical fiber connecting portion 140. The optical fiber connecting portion 140 is a connecting portion connected to an optical fiber 200.

The wavelength filter 132 is arranged in the optical waveguide 131, transmits the transmitted light from the optical input port 131A therethrough, outputs the transmitted light that has been transmitted therethrough, to the transmission line port 131C, and reflects the received light from the transmission line port 131C to the optical output port 131B.

However, a higher-order mode is generated in the optical device 100 by influence of, for example, reflection in the transmission line on the received light in the fundamental mode guided through the optical fiber 200. Therefore, a function of removing the higher-order mode is needed for the optical device 100 to be adapted, in particular, to long distance transmission and high bit rate transmission. In a known method, a mode filter to remove the higher-order mode is thus arranged on the transmission line of the optical fiber 200.

FIG. 10 is a diagram illustrating an example of a configuration having the optical device 100 and a mode filter 300 connected to each other. A system configuration illustrated in FIG. 10 includes the optical device 100, the mode filter 300, a first optical fiber 200A that connects between the optical device 100 and the mode filter 300, and a second optical fiber 200B connected to the mode filter 300. The mode filter 300 is connected in series with the first optical fiber 200A by fusion splicing and connected in series with the second optical fiber 200B by fusion splicing. Signal light in the fundamental mode is guided through the second optical fiber 200B and signal light in a higher-order mode is also generated in the second optical fiber 200B due to, for example, reflection in the transmission line. The mode filter 300 includes a curved waveguide 301 having a curvature. For example, received light in a higher-order mode is guided from the second optical fiber 200B through the curved waveguide 301 in the mode filter 300 and the received light in the higher-order mode is thereby radiated from the curved waveguide 301.

That is, in a case where the received light in the higher-order mode and fundamental mode has been guided from the second optical fiber 200B through the curved waveguide 301 in the mode filter 300, the received light in the fundamental mode is output from the mode filter 300 to the first optical fiber 200A by the radiation of the higher-order mode from the curved waveguide 301. The first optical fiber 200A then guides the received light in the fundamental mode from the mode filter 300 therethrough.

The optical device 100 then inputs the received light in the fundamental mode from the first optical fiber 200A into the optical waveguide 131 through the transmission line port 131C. The wavelength filter 132 in the optical waveguide 131 reflects the received light in the fundamental mode guided through the optical waveguide 131 to the optical output port 131B. The optical receiving terminal portion 120 receives the received light in the fundamental mode input from the optical output port 131B.

The optical transmission terminal portion 110 in the optical device 100 inputs transmitted light in the fundamental mode to the optical input port 131A in the optical waveguide 131. The wavelength filter 132 in the optical waveguide 131 transmits the transmitted light in the fundamental mode guided through the optical waveguide 131 therethrough and outputs the transmitted light in the fundamental mode that has been transmitted therethrough, to the transmission line port 131C.

The optical device 100 receives the received light in the fundamental mode by radiation of the higher-order mode from the received light from the second optical fiber 200B using the external mode filter 300. As a result, even if the higher-order mode is generated in the received light in the transmission line, the received light in the fundamental mode is able to be obtained at the optical receiving terminal portion 120 by use of the mode filter 300.

Patent Literature 1: Japanese Laid-open Patent Publication No. 11-258437

Patent Literature 2: International Publication Pamphlet No. WO 2008/108422

Patent Literature 3: U.S. Patent Application Publication No. 2002/0031304

Patent Literature 4: Japanese Laid-open Patent Publication No. 2016-018894

The configuration illustrated in FIG. 10 enables decrease in the waveguide length of the curved waveguide 301 and increase in the amount of the higher-order mode removed, by change in the design parameters (the mode field diameter (MFD), curve curvature, length, and relative refractive index difference) of the curved waveguide 301 in the mode filter 300. That is, the configuration can contribute to downsizing of the optical device 100.

However, in a case where the waveguide length is decreased, the waveguide loss and the coupling loss for the first optical fiber 200A are increased. Therefore, in reality, there is a demand for an optical device including a mode filter that enables minimization of the influence of the coupling loss for the first optical fiber 200A.

SUMMARY

According to an aspect of an embodiment, an optical device includes an optical waveguide circuit, an optical transmitter that transmits transmitted light to the optical waveguide circuit, and an optical receiver that receives received light from the optical waveguide circuit. The optical waveguide circuit includes an optical waveguide, a wavelength combiner and splitter and a mode filter. The optical waveguide includes a first port where the transmitted light output from the optical transmitter is input to and a second port where the transmitted light is output from, guides the transmitted light, and guides the received light input from the second port. The wavelength combiner and splitter is arranged in the optical waveguide between the first port and the second port. The mode filter removes a higher-order mode of the received light input by use of the wavelength combiner and splitter and includes a third port that outputs the received light having the higher-order mode removed from the received light, to the optical receiver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of an optical device according to a first embodiment;

FIG. 3 is a diagram illustrating an example of change in received light passing through each part in the optical device;

FIG. 10 is a diagram illustrating an example of a configuration having the optical device and a mode filter connected to each other.

DESCRIPTION OF EMBODIMENTS

Preferred embodiments of the present invention will be explained with reference to accompanying drawings. Techniques disclosed herein are not limited by these embodiments. The following embodiments may be combined with one another as appropriate so long as no contradiction is caused by the combination.

(a) First Embodiment

Figure 1:
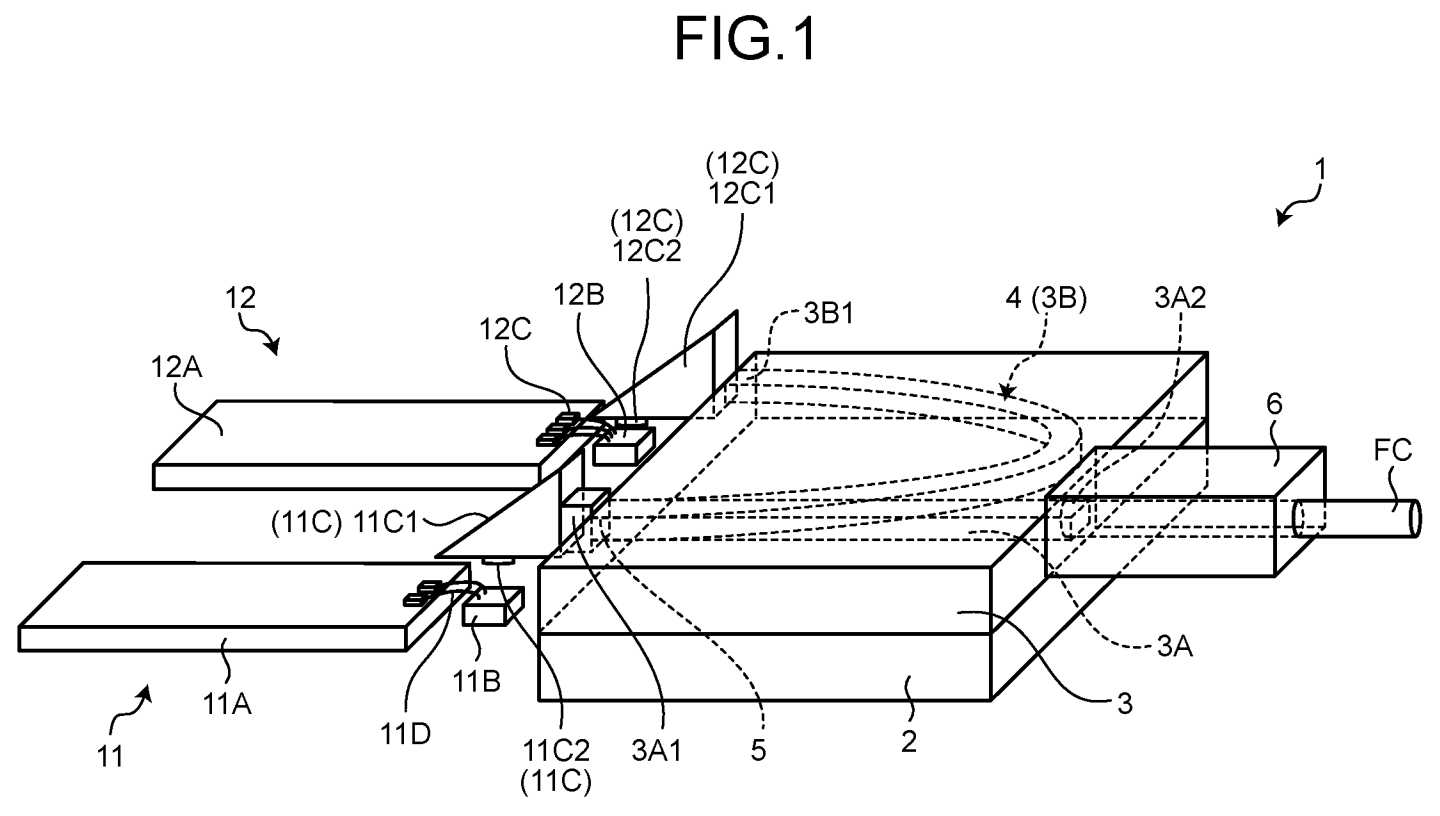
Figure 2:
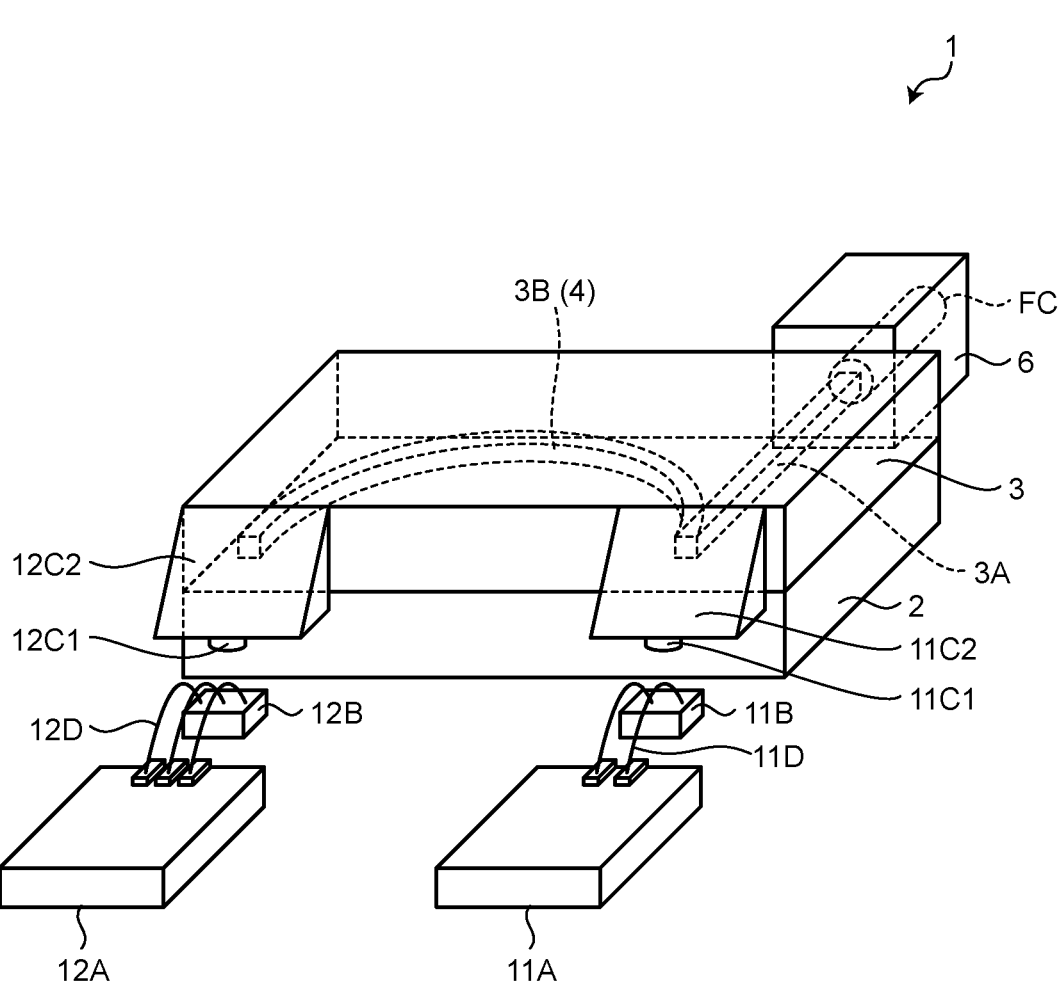
FIG. 2 is a diagram illustrating the example of the optical device according to the first embodiment.

FIG. 1 and FIG. 2 are diagrams illustrating an example of an optical device 1 according to a first embodiment. The optical device 1 illustrated in FIG. 1 is a single-fiber bidirectional optical device. The optical device 1 has a substrate 2, an optical waveguide circuit 3 formed on the substrate 2, an optical transmission unit 11 that transmits transmitted light to the optical waveguide circuit 3, and an optical receiving unit 12 that receives received light from the optical waveguide circuit 3. The optical waveguide circuit 3 has an optical waveguide 3A, a curved waveguide 3B that is a mode filter 4, a wavelength combiner and splitter 5, and a receptacle 6 for connecting an optical fiber FC.

The optical waveguide 3A includes a first port 3A1 where transmitted light output from the optical transmission unit 11 is input from and a second port 3A2 where the transmitted light is output to the optical fiber FC and the optical waveguide 3A guides the transmitted light therethrough. Furthermore, the optical waveguide 3A guides received light input from the second port 3A2 therethrough, the received light coming from the optical fiber FC. The wavelength combiner and splitter 5 is arranged in the optical waveguide 3A between the first port 3A1 and the second port 3A2. In response to input of received light input from the optical waveguide 3A by use of the wavelength combiner and splitter 5, the mode filter 4 removes a higher-order mode of the received light and includes a third port 3B1 that outputs the received light having the higher-order mode removed therefrom, to the optical receiving unit 12. The higher-order mode of the received light is radiated by the received light being guided through the curved waveguide 3B and the mode filter 4 thereby removes the higher-order mode.

The optical transmission unit 11 has a transmission IC 11A, a light emitting element 11B, a first optical component 11C that optically couples between the light emitting element 11B and the first port 3A1, and a metal wire 11D. The transmission IC 11A outputs an electric signal according to transmitted data, to the light emitting element 11B. The light emitting element 11B emits transmitted light according to the electric signal. The light emitting element 11B is, for example, an LD that outputs single mode signal light. The first optical component 11C has a first condenser lens 11C1 that condenses the transmitted light from the light emitting element 11B and a first optical path conversion prism 11C2 that reflects the transmitted light that has been condensed, to the first port 3A1.

The optical receiving unit 12 has a reception IC 12A, a light receiving element 12B, a second optical component 12C that optically couples between the light receiving element 12B and the third port 3B1, and a metal wire 12D. The second optical component 12C has a second optical path conversion prism 12C1 and a second condenser lens 12C2. The second optical path conversion prism 12C1 reflects the received light, from the third port 3B1 to the second condenser lens 12C2, the received light coming from the mode filter 4. The second condenser lens 12C2 condenses the received light reflected by the second optical path conversion prism 12C1 onto the light receiving element 12B. The light receiving element 12B performs conversion into an electric signal according to the received light and outputs the electric signal after the conversion, to the reception IC 12A. The reception IC 12A obtains received data from the electric signal coming from the light receiving element 12B.

The wavelength combiner and splitter 5 transmits transmitted light from the first port 3A1 therethrough and outputs the transmitted light transmitted therethrough to the second port 3A2 of the optical waveguide 3A and reflects received light from the second port 3A2 to the curved waveguide 3B that is the mode filter 4.

The mode filter 4 is the curved waveguide 3B having a curvature that allows the higher-order mode to be radiated. The mode filter 4 preferably has a waveguide layout (curve curvature and length) to enable output with an optical circuit configuration shortest in distance. The received light reflected by the wavelength combiner and splitter 5 is guided through the mode filter 4, the higher-order mode of the received light is thereby radiated, and the received light in the fundamental mode is thereby output to the third port 3B1.

The optical transmission unit 11 is, for example, a vertical cavity surface emitting laser (VCSEL) transmitter. Normally, the optical transmission unit 11 uses signal light of the 857 nm band but can also use transmitted light of the 1 μm band. The optical transmission unit 11 has the light emitting element 11B that emits single mode transmitted light. The optical fiber FC is, for example, an optical fiber that is a single mode fiber (SMF) of the 1.3 μm band. The transmitted light or received light of, for example, a wavelength band not longer than 1.26 μm that is the cutoff wavelength of the optical fiber FC, which is the SMF of the 1.3 μm band, is used.

Figure 3:
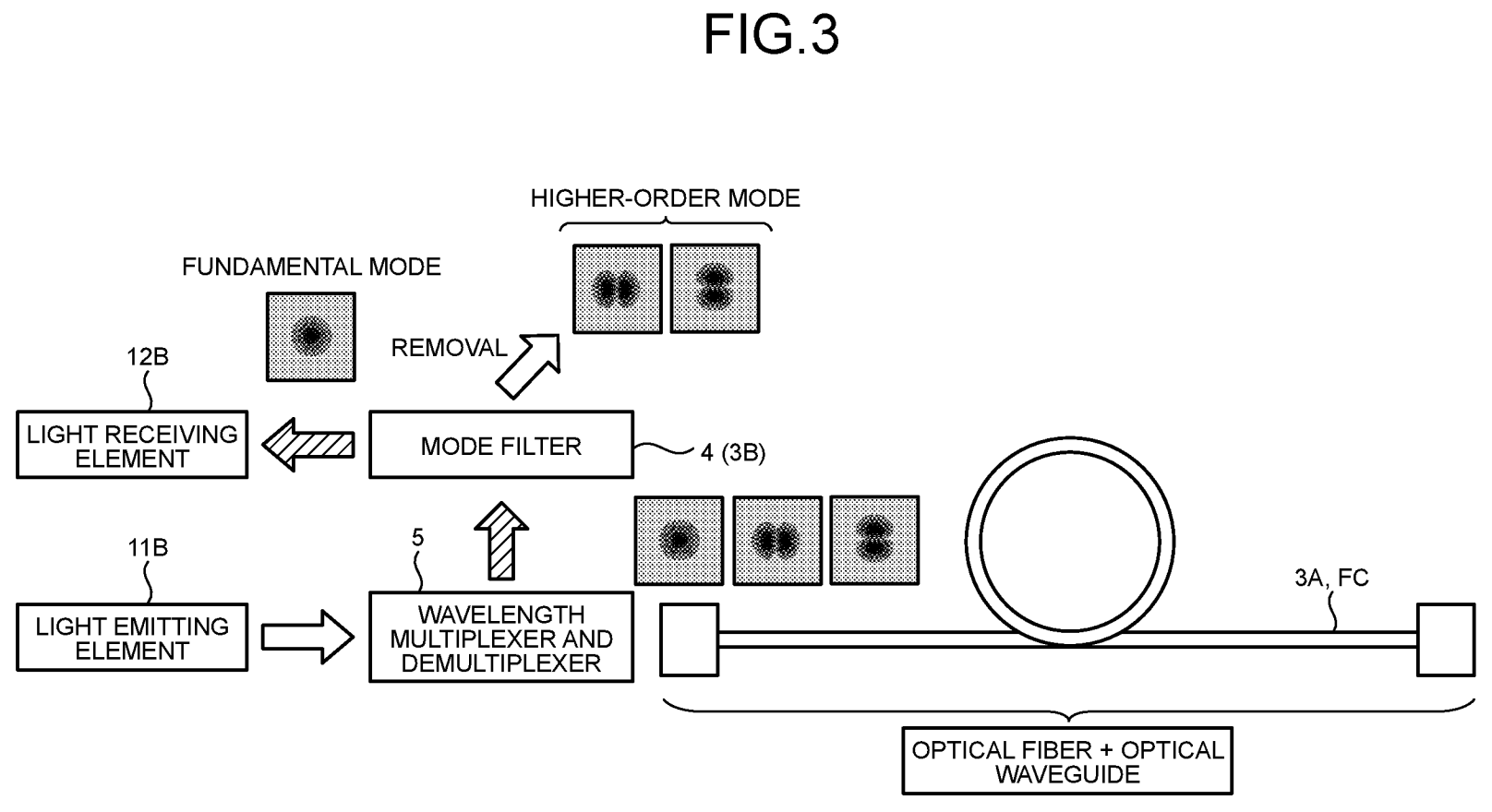

FIG. 3 is a diagram illustrating an example of change in received light passing through each part in the optical device

1. Due to the influence of, for example, reflection in the transmission line, a higher-order mode is generated in addition to the fundamental mode in the received light input to the optical device 1 from the optical fiber FC. Therefore, in the optical device 1, the received light in the higher-order mode and fundamental mode is input from the optical fiber FC through the second port 3A2 to the optical waveguide 3A.

The wavelength combiner and splitter 5 arranged in the optical waveguide 3A reflects the received light guided through the optical waveguide 3A to the mode filter 4 and outputs the reflected received light to the mode filter 4. The received light is, as described above, the received light in the fundamental mode and higher-order mode input from the optical fiber FC.

By the received light being guided through the mode filter 4 and the higher-order mode being radiated, the mode filter 4 outputs the received light in the fundamental mode to the light receiving element 12B. That is, in the optical device 1, the received light from the optical fiber FC is reflected to the mode filter 4 by use of the wavelength combiner and splitter 5, the received light is guided through the mode filter 4, the higher-order mode is thereby radiated, and the received light in the fundamental mode is thereby transmitted through and output from the mode filter 4. As a result, the higher-order mode of the received light is able to be removed.

In the optical device 1, transmitted light from the light emitting element 11B is input into the optical waveguide 3A through the first port 3A1. The wavelength combiner and splitter 5 arranged in the optical waveguide 3A transmits the transmitted light therethrough and outputs the transmitted light transmitted therethrough to the second port 3A2. The optical device 1 then outputs the transmitted light to the optical fiber FC from the second port 3A2.

That is, the optical device 1 outputs the transmitted light from the light emitting element 11B to the optical fiber FC via the optical waveguide 3A and not via the mode filter 4, and thus eliminates optical loss of the transmitted light, the optical loss being due to the mode filter 4.

Figure 10:
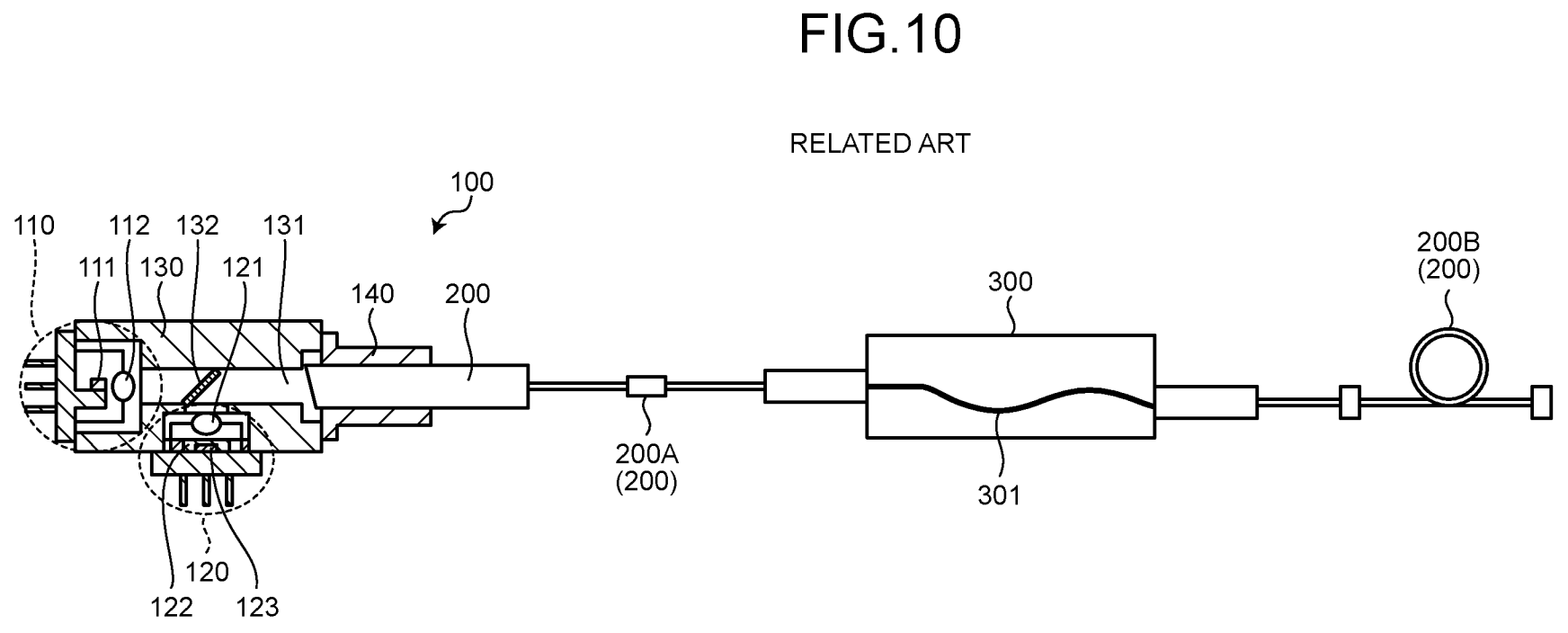

Optical loss in the optical device 1 according to the first embodiment and optical loss in the optical device 100 illustrated in FIG. 10 were examined. Optical loss for transmission in the optical device 100 illustrated in FIG. 10 includes coupling loss of 1 dB at the optical transmission terminal portion 110, loss of 0.3 dB in the mode filter 300, and coupling loss of 0.5 dB between the first optical fiber 200A and the mode filter 300. The optical loss for transmission also includes coupling loss of 0.5 dB and fusion loss of 0.1 dB, both between the first optical fiber 200A and the optical device 100. Therefore, the optical loss for transmission totals 2.4 dB.

Optical loss for reception in the optical device 100 includes coupling loss of 0.5 dB at the optical receiving terminal portion 120, loss of 0.3 dB in the mode filter 300, and coupling loss of 0.5 dB between the first optical fiber 200A and the mode filter 300. The optical loss for reception also includes coupling loss of 0.5 dB and fusion loss of 0.1 dB, both between the first optical fiber 200A and the optical device 100. Therefore, the optical loss for reception totals 1.9 dB.

By contrast, optical loss for transmission in the optical device 1 according to the first embodiment includes coupling loss of 1 dB at the optical transmission unit 11 and coupling loss of 0.5 dB between the optical fiber FC and the optical device 1. The optical loss for transmission thus totals 1.5 dB. Optical loss for reception includes coupling loss of 0.5 dB at the optical receiving unit 12, loss of 0.3 dB in the mode filter 4, and coupling loss of 0.5 dB between the optical fiber FC and the optical device 1. Therefore, the optical loss for reception totals 1.3 dB.

That is, the optical loss for transmission in the optical device 1 according to the first embodiment is able to be improved by 0.9 dB from that in the optical device 100 illustrated in FIG. 10 and the optical loss for reception in the optical device 1 is able to be improved by 0.6 dB from that in the optical device 100. Therefore, the optical device 1 enables further extension of the transmission distance.

The optical device 1 according to the first embodiment has the mode filter 4 arranged for reception only, and thus enables reception sensitivity to be improved by removing the higher-order mode components that may be generated in the optical fiber FC while minimizing the coupling loss for transmission and reception. That is, a small-sized and low loss single-fiber bidirectional optical device is able to be provided.

The optical device 1 is configured to have the wavelength combiner and splitter 5 arranged in the optical waveguide 3A of the optical waveguide circuit 3 and to output transmitted light from the second port 3A2 and not via the mode filter 4, and thus enables reduction in loss of the transmitted light.

Because a higher-order mode may be generated, through the transmission line, in received light input from the second port 3A2 of the optical device 1, the received light is reflected to the mode filter 4 by use of the wavelength combiner and splitter 5 and the received light is guided through the mode filter 4. By the received light being guided through the mode filter 4 in the optical device 1, the higher-order mode is removed and the received light in the fundamental mode is output to the optical receiving unit 12. As a result, reception sensitivity is improved by minimization of the coupling loss and removal of the higher-order mode components that may be generated in the optical fiber FC.

Because the optical device 1 is able to be configured to have the transmission IC 11A arranged immediately near the light emitting element 11B and the reception IC 12A arranged immediately near the light receiving element 12B, the optical device 1 enables high frequency properties to be achieved.

For example, because the wavelength band not longer than 1.26 μm that is the cutoff wavelength of the optical fiber FC, which is the SMF of the 1.3 μm band, is used for the transmitted light or received light, the optical device 1 enables long distance transmission and high bit rate transmission even if this wavelength band is used.

In the above described example of the optical device 1 according to the first embodiment, the second port 3A2 where transmitted light is output from and the optical fiber FC are directly connected optically, but the optical device 1 is not limited to this configuration. For example, a lens optical system may be arranged between the second port 3A2 and the optical fiber FC.

Figure 4:
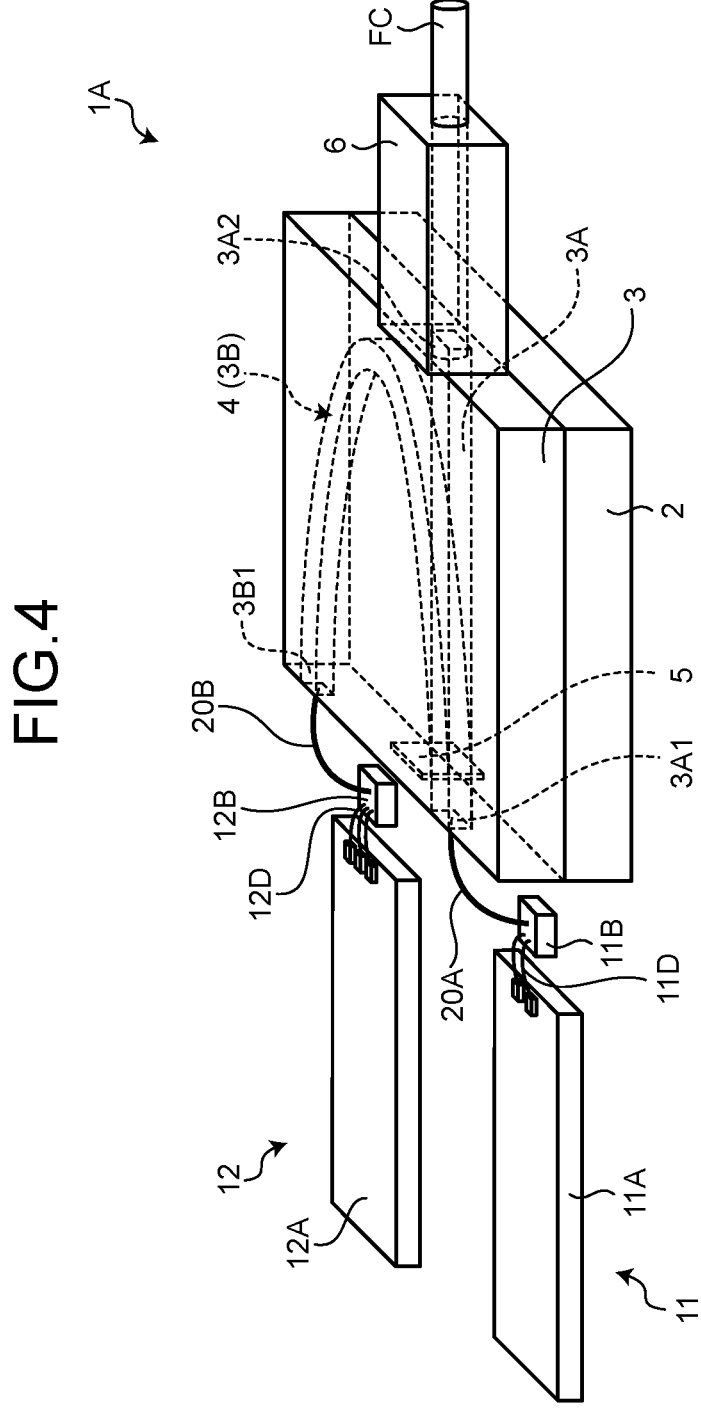
FIG. 4 is a diagram illustrating an example of an optical device according to a second embodiment.
Figure 5:
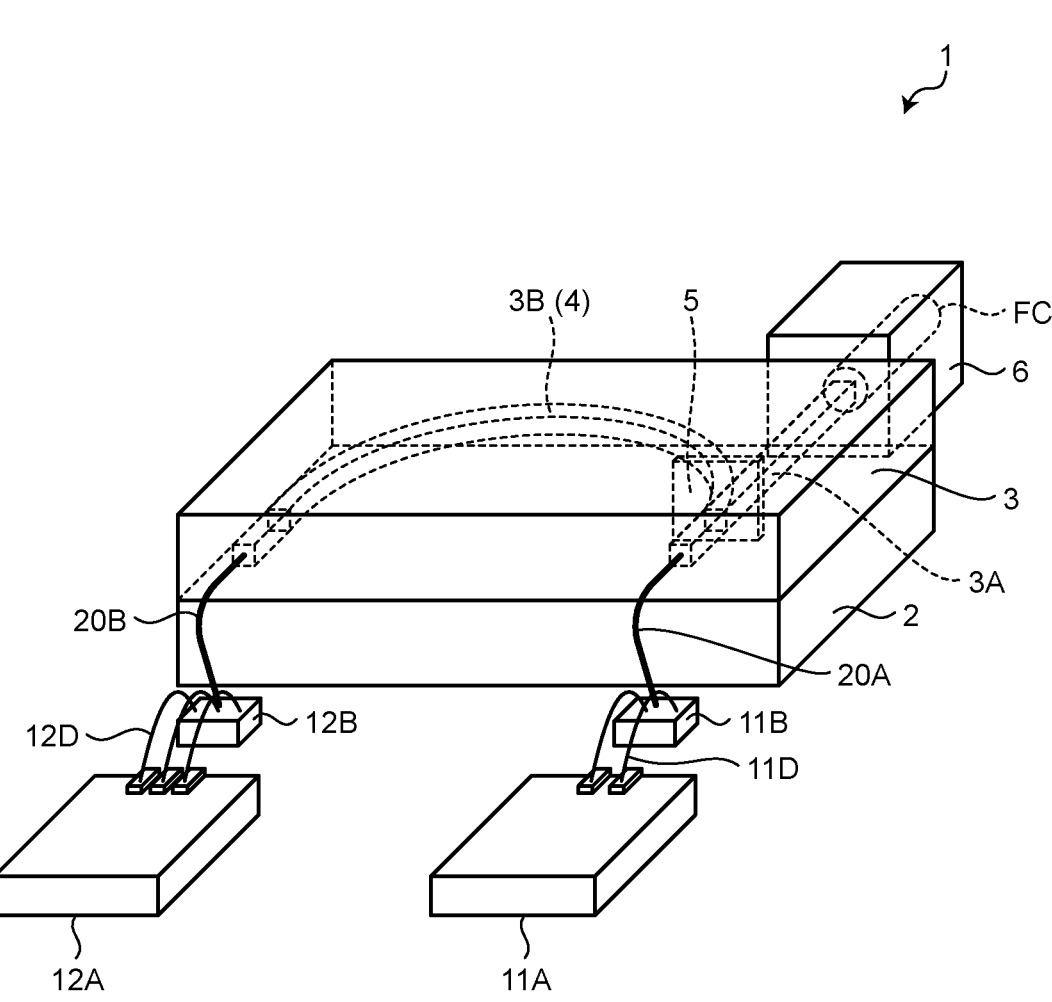
FIG. 5 is a diagram illustrating the example of the optical device according to the second embodiment.

The above described example of the optical device 1 according to the first embodiment has the first optical component 11C that optically couples between the light emitting element 11B and the first port 3A1 and the second optical component 12C that optically couples between the light receiving element 12B and the third port 3B1, but the optical device 1 is not limited to this configuration. A second embodiment described hereinafter is such an embodiment. FIG. 4 and FIG. 5 are diagrams illustrating an example of an optical device according to the second embodiment. By assignment of the same reference signs to components that are the same as those of the optical device 1 according to the first embodiment, description of the same components and operation thereof will be omitted.

(b) Second Embodiment

An optical device 1A illustrated in FIG. 4 and FIG. 5 is different from the optical device 1 according to the first embodiment in that a first photonic wire bond 20A is arranged instead of the first optical component 11C and a second photonic wire bond 20B is arranged instead of the second optical component 12C.

The first photonic wire bond 20A is an optical waveguide that optically couples between the light emitting element 11B and the first port 3A1. The second photonic wire bond 20B is an optical waveguide that optically couples between the light receiving element 12B and the third port 3B1. The first photonic wire bond 20A and the second photonic wire bond 20B are, for example, photonic wire bonds made of a UV curable resin.

In the optical device 1A according to the second embodiment, the first photonic wire bond 20A optically couples between the light emitting element 11B and the first port 3A1 and the second photonic wire bond 20B optically couples between the light receiving element 12B and the third port 3B1. As a result, the optical coupling between the light emitting element 11B and the first port 3A1 and between the light receiving element 12B and the third port 3B1 is improved.

For illustration purpose, in the above described examples, the wavelength combiner and splitter 5 is used on the optical waveguide 3A but the examples may be modified as appropriate, and different wavelengths may be used for the received light and transmitted light and a directional coupler may be used instead.

In the above described examples, the mode filter 4 is the curved waveguide 3B but any function enabling a higher-order mode to be removed may be adopted. A third embodiment and a fourth embodiment will hereinafter be described as such embodiments.

(c) Third Embodiment

Figure 6:
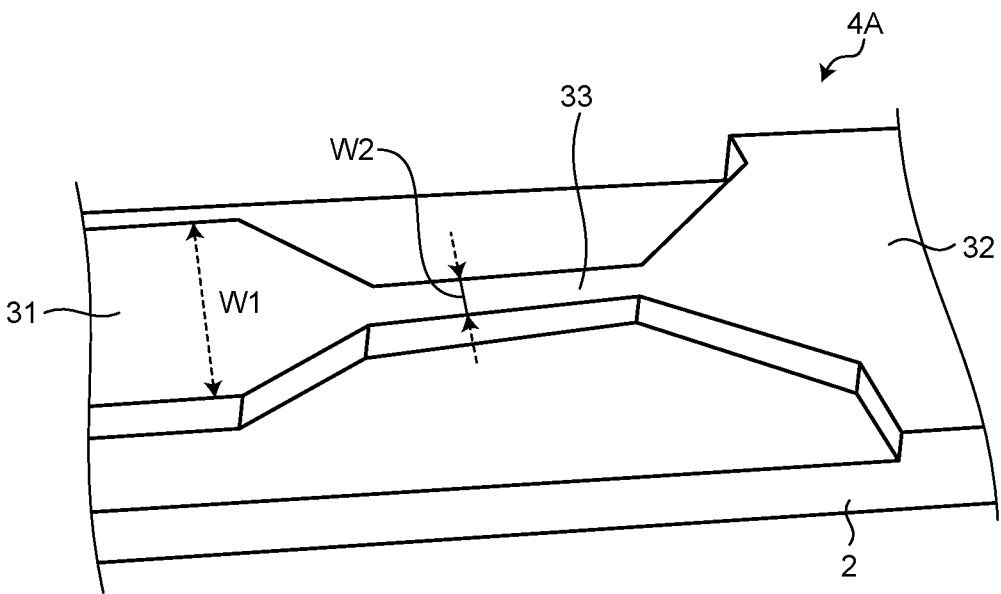
FIG. 6 is a diagram illustrating an example of a mode filter according to a third embodiment.

FIG. 6 is a diagram illustrating an example of a mode filter 4A according to the third embodiment. The mode filter 4A according to the third embodiment is different from the mode filter 4 in the optical device 1 according to the first embodiment in that the mode filter 4A is, instead of the curved waveguide 3B, a waveguide that changes in waveguide width.

The mode filter 4A illustrated in FIG. 6 has a first rib waveguide 31, a second rib waveguide 32, and a linear waveguide 33 that couples between the first rib waveguide 31 and the second rib waveguide 32. The first rib waveguide 31 is a rib waveguide connected to the wavelength combiner and splitter 5 arranged in the optical waveguide 3A. The second rib waveguide 32 is a rib waveguide connected to the third port 3B1. The linear waveguide 33 has a waveguide width W2 narrower than a waveguide width W1 of the first rib waveguide 31 and the second rib waveguide 32.

The first rib waveguide 31 has a portion optically coupled to the linear waveguide 33, the portion having a tapered structure that gradually narrows toward the linear waveguide 33. The second rib waveguide 32 has a portion optically coupled to the linear waveguide 33, the portion having a tapered structure that gradually narrows toward the linear waveguide 33.

By received light being guided through the second rib waveguide 32 via the linear waveguide 33 from the first rib waveguide 31, the mode filter 4A removes a higher-order mode from the received light and outputs the received light in the fundamental mode.

(d) Fourth Embodiment

Figure 7:
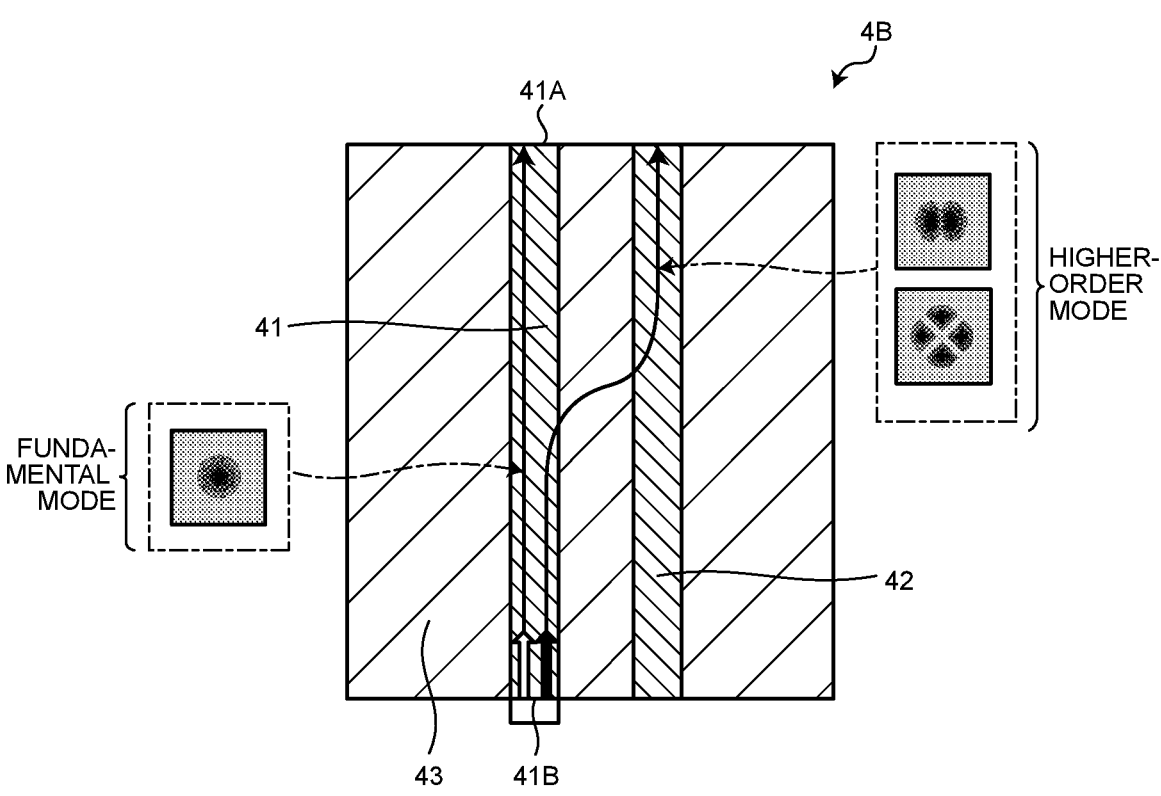
FIG. 7 is a diagram illustrating an example of a mode filter according to a fourth embodiment.

FIG. 7 is a diagram illustrating an example of a mode filter 4B according to the fourth embodiment. The mode filter 4B according to the fourth embodiment is different from the mode filter 4 in the optical device 1 according to the first embodiment in that the mode filter 4B is, instead of the curved waveguide 3B, a directional coupler.

The mode filter 4B illustrated in FIG. 7 is a directional coupler having a first core 41, a second core 42, and cladding 43 surrounding the first core 41 and the second core 42. The first core 41 and the second core 42 extend along a longitudinal direction of the directional coupler. The first core 41 and the second core 42 are formed in parallel with each other at an interval so as to be able to be optically coupled to each other. The first core 41 and second core 42 are formed at an interval allowing the first core 41 and second core 42 to be optically coupled to each other so that transition of a higher-order mode is possible.

The first core 41 is a waveguide having one end 41A connected to the wavelength combiner and splitter 5 arranged in the optical waveguide 3A and another end 41B connected to the third port 3B1. The second core 42 is a waveguide that received light in the higher-order mode transitions to.

By received light being guided through the first core 41, the received light having been input from the wavelength combiner and splitter 5, the received light in the higher-order mode transitions to the second core 42. By the received light in the higher-order mode gradually transitioning to the second core 42, the first core 41 outputs the received light in the fundamental mode to the third port 3B1.

Figure 8:
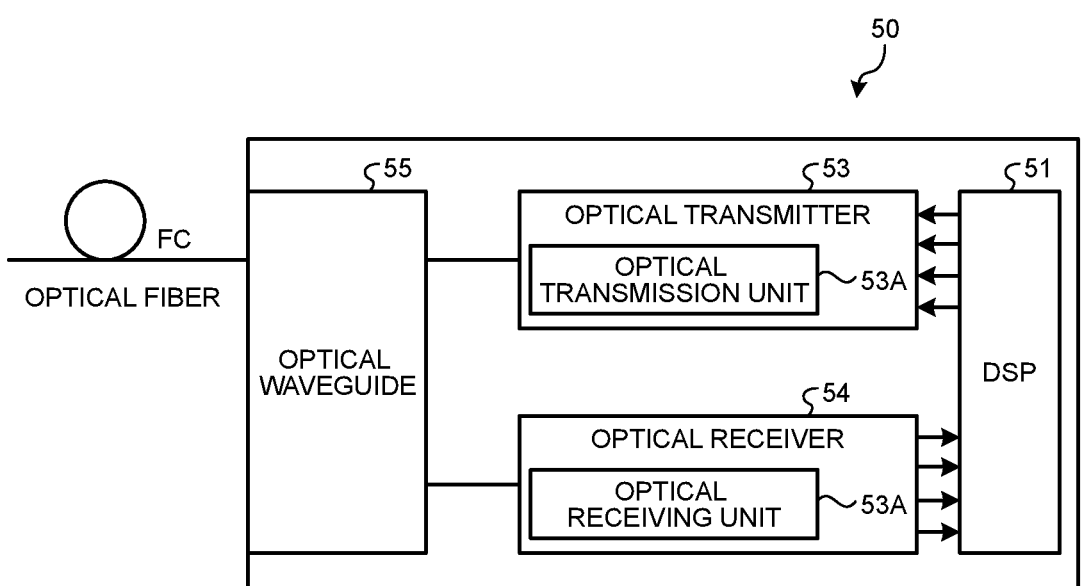
FIG. 8 is a diagram illustrating an example of an optical transmission and reception apparatus according to an embodiment.
Figure 9:
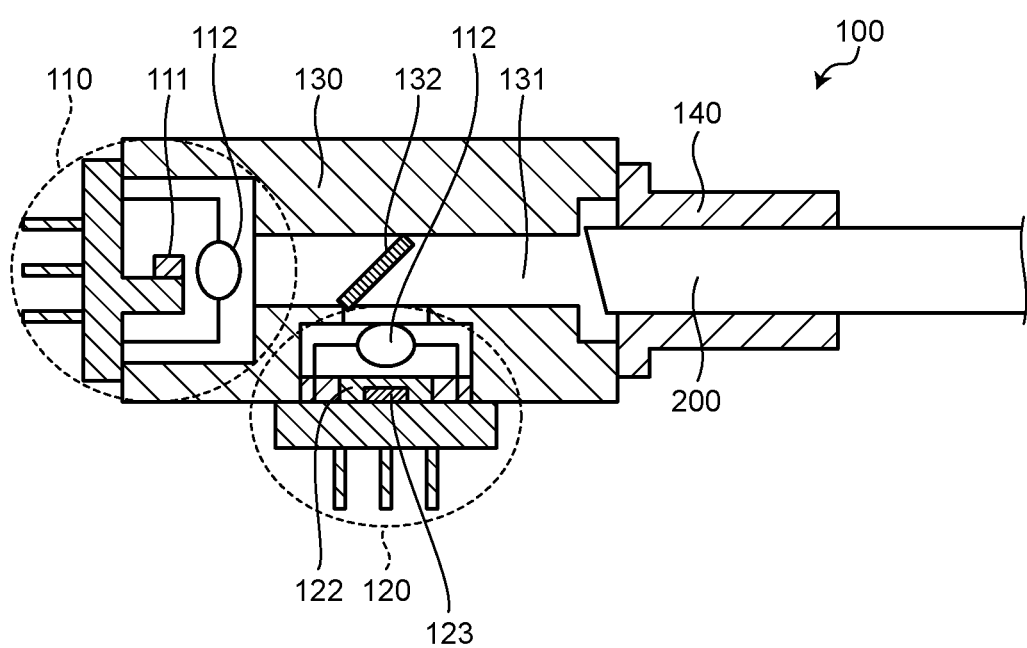
FIG. 9 is a diagram illustrating an example of an optical device.

An optical transmission and reception apparatus 50 having the optical device according to any one of the first to fourth embodiments will be described next. FIG. 8 is a diagram illustrating an example of the optical transmission and reception apparatus 50 according to an embodiment. The optical transmission and reception apparatus 50 illustrated in FIG. 8 is connected to an optical fiber FC. The optical transmission and reception apparatus 50 has a digital signal processor (DSP) 51, an optical transmitter 53, an optical receiver 54, and an optical waveguide 55. The DSP 51 is an electric component that executes digital signal processing. The DSP 51 executes, for example, processing, such as encoding of transmitted data, generates an electric signal including the transmitted data, and outputs the electric signal generated, to the optical transmitter 53. Furthermore, the DSP 51 obtains an electric signal including received data from the optical receiver 54, executes processing, such as decoding of the electric signal obtained, and obtains the received data.

The optical transmitter 53 modulates light using the electric signal output from the DSP 51 and outputs the obtained transmitted light to the optical fiber FC. The optical transmitter 53 has an optical transmission unit 53A that modulates, using the electric signal input, light propagating through the waveguide and that thereby generates the transmitted light.

The optical receiver 54 has an optical receiving unit 54A that receives an optical signal from the optical fiber FC and that demodulates received light using light. The optical receiver 54 converts the received light that has been demodulated, to an electric signal and outputs the electric signal that has been converted, to the DSP 51.

The optical waveguide 55 is connected to the optical transmitter 53, receives transmitted light from the optical transmitter 53, is connected to the optical fiber FC, and outputs the transmitted light to the optical fiber FC. Furthermore, the optical waveguide 55 is connected to the optical fiber FC, receives received light from the optical fiber FC, is connected to the optical receiver 54, and outputs the received light to the optical receiver 54. That is, the optical waveguide 55 is, for example, the optical waveguide circuit 3 adopted in the first embodiment.

Because the mode filter 4 is arranged for reception only in the optical transmission and reception apparatus 50 according to this embodiment, reception sensitivity is improved by minimization of coupling loss for transmission and reception and removal of higher-order mode components that may be generated in the optical fiber FC.

The optical transmission and reception apparatus 50 is configured to have the wavelength combiner and splitter 5 arranged in the optical waveguide 3A of the optical waveguide circuit 3 and to output transmitted light from the second port 3A2 and not via the mode filter 4, and loss of the transmitted light is thus able to be reduced.

In the optical transmission and reception apparatus 50, a higher-order mode may be generated, through the transmission line, in received light input from the second port 3A2, and the received light is thus reflected to the mode filter 4 by use of the wavelength combiner and splitter 5 and the received light is thus guided through the mode filter 4. In the optical transmission and reception apparatus 50, the higher-order mode is removed and the received light in the fundamental mode is output to the optical receiver 54, by received light being guided through the mode filter 4. As a result, reception sensitivity is improved by minimization of the coupling loss and removal of the higher-order mode components that may be generated in the optical fiber FC.

FIG. 8 illustrates the optical transmission and reception apparatus 50 including the DSP 51 as an example, but for example, this embodiment is also applicable to an optical module having the optical transmitter 53, the optical receiver 54, and the optical waveguide 55 that have been formed into a module separately bodied from the DSP 51. In this case, the optical waveguide 55 in the optical module is, for example, the optical waveguide circuit 3 adopted in the first embodiment.

Because the mode filter 4 is arranged for reception only in the optical module according to this embodiment, reception sensitivity is improved by minimization of the coupling loss for transmission and reception and removal of higher-order mode components that may be generated in the optical fiber FC.

The components of each unit illustrated in the drawings may be not configured physically as illustrated in the drawings. That is, specific forms of distribution and integration of each unit are not limited to those illustrated in the drawings, and all or part of each unit may be configured to be distributed or integrated functionally or physically in any units, according to various loads and/or use situations, for example.

According to one aspect, coupling loss for optical fibers is able to be minimized.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising an optical waveguide circuit, an optical transmitter that transmits transmitted light to the optical waveguide circuit, and an optical receiver that receives received light from the optical waveguide circuit, wherein the optical waveguide circuit includes:

an optical waveguide that includes a first port where the transmitted light output from the optical transmitter is input to and a second port where the transmitted light is output from, guides the transmitted light, and guides the received light input from the second port;

a wavelength combiner and splitter arranged in the optical waveguide between the first port and the second port; and a mode filter that removes a higher-order mode of the received light input by use of the wavelength combiner and splitter and includes a third port that outputs the received light having the higher-order mode removed from the received light, to the optical receiver, wherein the mode filter is a curved waveguide having a curvature that allows the higher-order mode to be removed.

2. The optical device according to claim 1, wherein the optical transmitter further includes a light emitting element that emits the transmitted light that is in a single mode.

3. The optical device according to claim 1, wherein the mode filter has a first core and a second core that is arranged in parallel with the first core and that causes transition of the higher-order mode of the received light guided through the first core.

4. The optical device according to claim 1, wherein the transmitted light or the received light has a wavelength band of a cutoff wavelength of an optical fiber that is a single mode fiber (SMF) or shorter.

5. The optical device according to claim 1, further includes:

a first optical component that optically couples between the optical transmitter and the first port; and a second optical component that optically couples between the optical receiver and the third port, wherein the first optical component includes:

a first condenser lens that condenses the transmitted light from the optical transmitter; and a first optical path conversion prism that optically couples the transmitted light condensed by the first condenser lens to the first port, and the second optical component includes:

a second condenser lens that condenses the received light onto the optical receiver; and a second optical path conversion prism that optically couples the received light input from the third port to the second condenser lens.

6. The optical device according to claim 1, further including:

a first photonic wire bond that optically couples between the optical transmitter and the first port; and a second photonic wire bond that optically couples between the optical receiver and the third port.

7. An optical module, comprising:

an optical transmitter that outputs transmitted light;

an optical receiver that receives received light; and an optical waveguide circuit that guides the transmitted light from the optical transmitter and guides the received light to the optical receiver, wherein the optical waveguide circuit includes:

an optical waveguide that includes a first port where the transmitted light output from the optical transmitter is input to and a second port where the transmitted light is output from, guides the transmitted light, and guides the received light input from the second port;

a wavelength combiner and splitter arranged in the optical waveguide between the first port and the second port; and a mode filter that removes a higher-order mode of the received light input by use of the wavelength combiner and splitter and includes a third port that outputs the received light having the higher-order mode removed from the received light, to the optical receiver, wherein the mode filter is a curved waveguide having a curvature that allows the higher-order mode to be removed.

8. An optical transmission and reception apparatus comprising an optical transmitter that outputs transmitted light based on an electric signal according to transmitted data, an optical receiver that outputs an electric signal according to received data from received light that has been received, an optical waveguide circuit that guides the transmitted light from the optical transmitter and guides the received light to the optical receiver, and a processor that executes signal processing of the electric signals, wherein the optical waveguide circuit includes:

an optical waveguide that includes a first port where the transmitted light output from the optical transmitter is input to and a second port where the transmitted light is output from, guides the transmitted light, and guides the received light input from the second port;

a wavelength combiner and splitter arranged in the optical waveguide between the first port and the second port; and a mode filter that removes a higher-order mode of the received light input by use of the wavelength combiner and splitter and includes a third port that outputs the received light having the higher-order mode removed from the received light, to the optical receiver, wherein the mode filter is a curved waveguide having a curvature that allows the higher-order mode to be removed.

* * * * *